US011493126B2

(12) United States Patent
Paula et al.

(10) Patent No.: US 11,493,126 B2
(45) Date of Patent: Nov. 8, 2022

(54) METHOD AND CONTROL UNIT FOR OPERATING A DRIVE TRAIN (71) Applicant: Renk Aktiengesellschaft, Augsburg (DE)

(72) Inventors: Michael Paula, Augsburg (DE); Philip Schweiger, Neusäss (DE); Marcus Köhnlein, Möttingen/Enkingen (DE)

(73) Assignee: RENK GMBH, Augsburg (DE)

( * ) Notice: Subject to any disclaimer, the term of this patent is extended or adjusted under 35 U.S.C. 154(b) by 220 days.

(21) Appl. No.: 16/779,945

(22) Filed: Feb. 3, 2020

(65) Prior Publication Data
US 2020/0247238 A1 Aug. 6, 2020

(30) Foreign Application Priority Data

Feb. 6, 2019 (DE) ..................... 10 2019 102 881.7

(51) Int. Cl.
*F16H 59/00* (2006.01)
*F16H 59/04* (2006.01)
*B60K 25/00* (2006.01)
(52) U.S. Cl.
CPC ...... *F16H 59/045* (2013.01); *B60K 2025/005* (2013.01)
(58) Field of Classification Search
CPC ........ F16H 59/045; F16H 59/38; F16H 59/46; F16H 3/72; F04B 17/03; F04B 35/04; B60K 2025/005; Y02T 10/72; H02P 1/04; H02P 1/16; H02P 4/00
See application file for complete search history.

(56) References Cited

U.S. PATENT DOCUMENTS 10,465,774 B2* 11/2019 Okamoto .......... F16H 61/66259
10,626,953 B2* 4/2020 Okamoto ............. F16H 1/2827
10,738,858 B2* 8/2020 Miyata .................... F16H 3/724
(Continued)

FOREIGN PATENT DOCUMENTS

DE 102014225738 6/2016
DE 102015006084 11/2016
(Continued)

OTHER PUBLICATIONS

Office Action dated Nov. 18, 2021 German Patent Application No. 10 2019 102 881.7.

*Primary Examiner* — Phutthiwat Wongwian
*Assistant Examiner* — Sherman D Manley
(74) *Attorney, Agent, or Firm* — Cozen O'Connor (57) ABSTRACT A method for operating a drive train, having a main and, an auxiliary drive and a speed modulation gearbox with a fixed mechanical transmission ratio between the two drives, for starting and towing a drive train to a defined set rotational speed. The main drive is started via a direct-on-line-start with direct coupling to a supply network. The auxiliary drive is started simultaneously with at a time before or at a time after the main drive. For towing the drive train to the defined set rotational speed, which corresponds to a defined percentage of a rated rotational speed of the drive train, the main drive is operated motorically in forward mode at least at times and accelerated to its rated rotational speed, wherein parallel to this the auxiliary drive is operated motorically in reverse mode at least at times.

9 Claims, 8 Drawing Sheets (56) References Cited

U.S. PATENT DOCUMENTS

| | | | |
|---|---|---|---|
| 10,760,654 B2* | 9/2020 | Kennedy | F04B 49/06 |
| 2005/0113201 A1* | 5/2005 | Kimura | F16H 3/725 |
| | | | 903/910 |
| 2021/0155103 A1* | 5/2021 | Zhu | B60L 53/22 |

FOREIGN PATENT DOCUMENTS

| | | |
|---|---|---|
| DE | 102017101650 | 8/2018 |
| DE | 102017104461 | 9/2018 |
| WO | WO 2016059115 | 4/2016 |
| WO | WO 2016172742 | 11/2016 |

\* cited by examiner

METHOD AND CONTROL UNIT FOR OPERATING A DRIVE TRAIN

BACKGROUND OF INVENTION

1. Field of the Invention

The invention relates to a method for operating a drive train with a working machine designed in particular as a pump or a compressor, having a main drive designed as electric machine that can be operated with a constant rotational speed, an auxiliary drive designed as electric machine that can be operated with a variable rotational speed, and a speed modulation gearbox with a fixed mechanical transmission ratio connected between the two drives and the working machine, namely for starting the drive train and for driving the working machine to a defined set rotational speed. Furthermore, the invention relates to a control unit.

2. Description of Related Art

When a drive train is started with a working machine designed as a pump or a compressor for towing the working machine, it is already fundamentally known from practice to start a drive designed as electric machine, which can be operated with a constant rotational speed, by way of a so-called direct-on-line-start (DOL-start) with direct coupling to a supply network. With such a direct-on-line-start, the drive designed as electric machine draws a multiple of its rated current from the supplied network, wherein because of this the mains voltage of the supply network dips, and the supply network is subjected to substantial load, the operation of other consumers connected to the supply network can thereby be negatively affected. To date, in order to take this problem into account, the supply network or the drive, as a consequence, has to be suitably designed for the drive train, as a result of which an over-dimensioning compared with a so-called rated operation of the drive train is created. This leads both to high investment costs and also to a poor efficiency in rated operation.

From DE 10 2015 006 084 A1 and from DE 10 2017 101 650 A1, exemplary drive trains each having a speed modulation gearbox are known. The speed modulation gearbox has a fixed mechanical transmission ratio and is connected between two drive units and a working machine in order to drive the working machine.

From DE 10 2014 225 738 A1 a method for operating a drive train is known, with which an electric main motor that can be operated with constant rotational speed and an electric regulator machine that can be operated with variable rotational speed are run up from the stationary state namely utilising a rotational speed-dependent control.

SUMMARY OF THE INVENTION

There is a need for a new type of method for starting such a drive train, namely utilising a direct-on-line-start for the main drive, with which there is no need for having to over-dimension either the supply network or the main drive. Starting out from this, one aspect of the invention is based on creating a new type of method and control unit for operating a drive train.

The method according to one aspect of the invention comprises at least the following steps: the main drive is started by way of a direct-on-line-start with direct coupling to a supply network. Subject to the intermediate connection of a converter with direct coupling to the supply network, the auxiliary drive is started simultaneously with the main drive or at a time before the main drive or at a time after the main drive. For towing or bringing the working machine to the defined set rotational speed, which corresponds to a defined percentage of a rated rotational speed of the drive train, the main drive is at least at times operated motorically in forward mode and accelerated to its rated rotational speed, wherein parallel to this the auxiliary drive is operated motorically in reverse mode at least at times.

By way of the method according to one aspect of the invention, a safe starting of the drive train and towing of the drive train to a defined set rotational speed of the drive train, which is smaller by the defined percentage than the rated rotational speed of the drive train, can take place. During this, the main drive is operated motorically in forward mode at least at times and the auxiliary drive, parallel thereto in time, motorically in reverse mode at least at times. By way of this operation, the mechanical transmission ratio of the speed modulation gearbox that is fixed as such can be electrically influenced through the corresponding operation of the auxiliary drive that can be operated with variable rotational speed so that on reaching the rated rotational speed of the main drive the working machine has a lower rotational speed than the rated rotational speed of the same. This then results in a reduced torque of the drive train. In this case, the main drive then merely has to generate a torque which is below its rated torque. The main drive and the supply network can then be dimensioned smaller.

Accordingly, the auxiliary drive is actively utilised for supporting a direct-on-line-start for the main drive in the drive train with the speed modulation gearbox, which has a fixed mechanical transmission ratio, in order to start the drive train without an impermissibly high load on the supply network.

Preferentially, on reaching the defined set rotational speed on the working machine or on reaching the rated rotational speed on the main drive, the auxiliary drive is subsequently operated generatorically in reverse at least at times, wherein on reaching the defined set rotational speed on the drive train or on reaching the rated rotational speed on the main drive, the converter is activated in order to change on the auxiliary drive from the motorically reverse operation into the generatorically reverse operation. As soon as the working machine has been tow-started up to its defined set rotational speed or the main drive has reached its rated rotational speed, the starting operation is concluded and the mains voltage of the supply network is at the starting level. Then, the auxiliary drive changes from the motoric into the generatoric mode, namely by suitable activation of the converter.

Particularly preferred are versions of the invention in which the auxiliary drive is started at the same time with the main drive or at a time after the main drive. In particular when the auxiliary drive is started at a time after the main drive, this is effected in such a manner that initially, towing the working machine, exclusively the main drive is operated motorically in forward mode and the auxiliary drive is initially stationary, wherein subsequently after a defined period of time has lapsed or on reaching a defined threshold value for the rotational speed of the drive train, the auxiliary drive is operated motorically in reverse mode parallel to this. The version of the invention, in which the auxiliary drive is started at a time after the main drive, is advantageous in order to exclude a possible reverse-rotating of the drive train at any rate. This is significant in particular when in the drive train for example as drive train a pump or a compressor is utilised for which a reverse rotation has to be prevented at any rate. Although the simultaneous starting to main drive and auxiliary drive or the starting of the auxiliary drive at a time after the main drive are preferred, it is basically also possible to start the main drive at a time after the auxiliary drive.

BRIEF DESCRIPTION OF THE DRAWINGS

Preferred further development of the invention are obtained from the subclaims and the following description. Exemplary embodiments of the invention are explained in more detail by way of the drawing without being restricted to this. There it shows:

DETAILED DESCRIPTION OF THE PRESENTLY PREFERRED EMBODIMENTS

Figure 1:
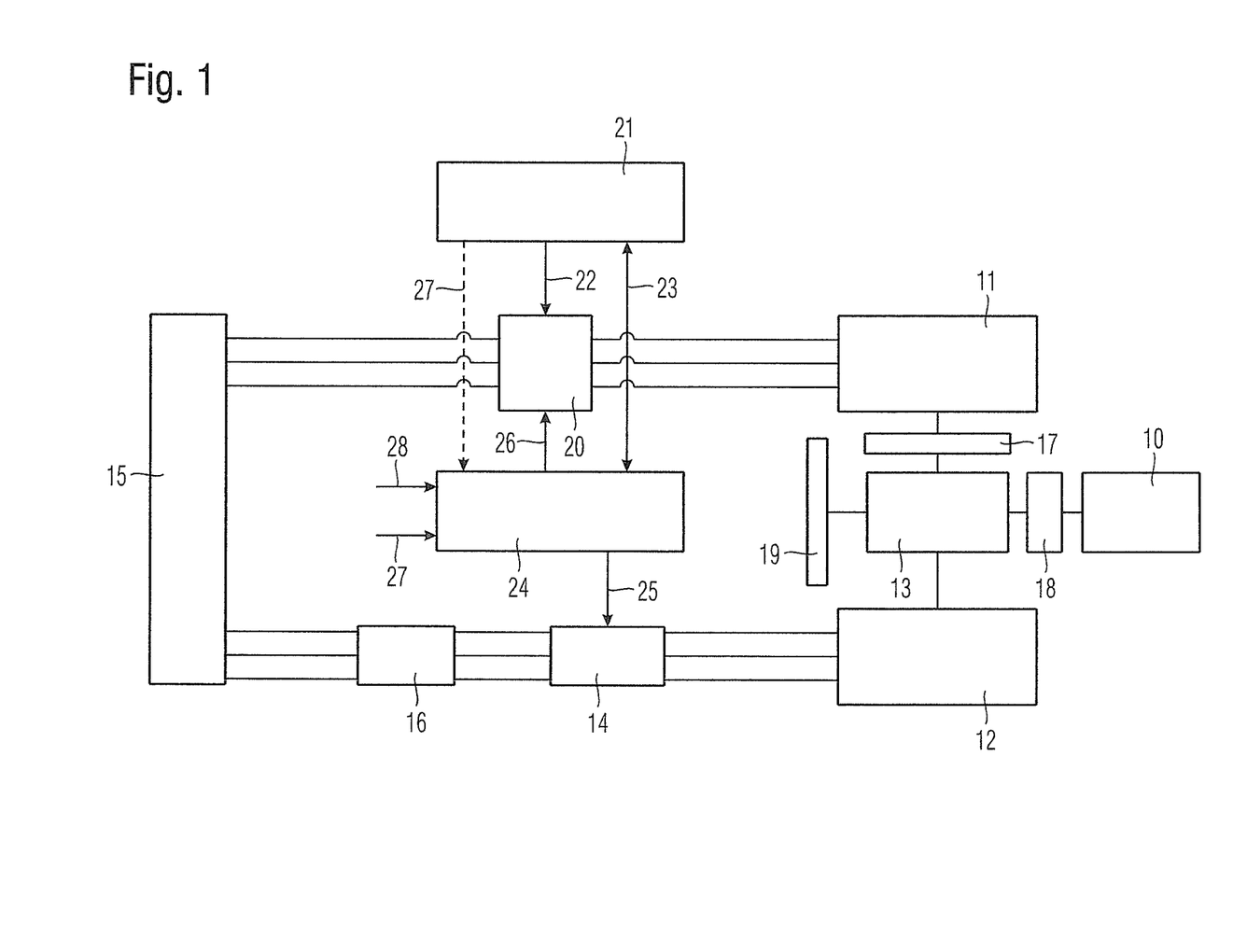
FIG. 1 is a block diagram of a drive train.

FIG. 1 shows a block diagram of a possible construction of a drive train that can be operated with the invention present here.

Accordingly, the drive train comprises a drive train 10, wherein the drive train 10 is in particular a pump or a compressor. The drive train 10 can be driven from a main drive 11 and an auxiliary drive 12, wherein between the two drives 11, 12 and the drive train 10 a speed modulation gearbox 13 is connected.

The main drive 11 is an electric machine that can be operated with a constant rotational speed. In particular when this main drive 11 is switched on an accelerated to its rated rotational speed, the same runs with a constant rotational speed. The auxiliary drive 12 is likewise an electric machine which can be operated with a variable rotational speed. A converter 14, which is connected between a supply network 15 and the auxiliary drive 12 serves for this purpose. Here, a transformer 16 can be connected between the supply network 15 and the converter 14 according to FIG. 1.

FIG. 1 shows as possible optional assemblies of the drive train including but not limited to a first clutch 17, which is connected between the main drive 11 and the speed modulation gearbox 13, and a second clutch 18, which is connected between the speed modulation gearbox 13 and the drive train 10. As further optional assembly, FIG. 1 shows a brake 19, which acts on the speed modulation gearbox 13.

The speed modulation gearbox 13 is a speed modulation gearbox with a fixed mechanical transmission ratio. The speed modulation gearbox 13 can be designed for example as known from DE 10 2015 006 084 A1 or from DE 10 2017 101 650 A1. However, other designs of a speed modulation gearbox 13 with fixed mechanical transmission ratio are also possible.

According to FIG. 1, a circuit breaker 20 is connected between the supply network 15 and the main drive 11, which for example can be switched on and switched off by way of a control unit 21 in accordance with the switching signal 22. This control unit 21 communicates in accordance with the double arrow 23 with a further control unit 24 which in accordance with the switching signal 25 serves for activating the converter 14.

In particular when the control unit 21 is omitted, the circuit breaker 20 in accordance with the switching signal 26 can also be alternatively switched on and switched off by the control unit 24. Accordingly, the control unit 21 is optional.

For the operation of the drive train for starting the drive train and for towing the drive train 10 to a defined set rotational speed, the control unit 24 is provided with a corresponding set rotational speed default 27, namely either by suitable input directly on the control unit 24 or alternatively emanating from the control unit 21.

Preferentially, the control unit 24 receives further input variable 28, in particular rotational speeds of working machines 10 and/or main drive 11 and/or auxiliary drive 12 detected by measurement, which can be detected by measurement by rotational speed sensors that are suitably installed on the drive train 10, the main drive 11 and the auxiliary drive 12.

In order to start such a drive train and tow-start the drive train 10 from the stationary state to a defined set rotational speed, the main drive 11, which can be operated with constant rotational speed, is started via a direct-on-line-start with direct coupling to the supply network, namely in that the circuit breaker 20 is switched on either in accordance with the switching signal 22 emanating from the control unit 21, or in accordance with the switching signal 26 emanating from the control unit 24.

Furthermore, the auxiliary drive 12, which can operated with variable rotational speed, is started subject to the intermediate connection of the converter 14, with direct coupling to the supply network 15, namely either at the same time with the main drive 11, at a time before the main drive 11, or at a time after the main drive 11.

For towing the drive train 10 to its defined set rotational speed, which corresponds to a defined percentage for example 70% or 80%, of the rated rotational speed of the drive train 10, the main drive 11 is operated motorically in forward mode at least at times and accelerated to its rated rotational speed, wherein parallel to this the auxiliary drive 12 is operated motorically in reverse mode at least at times. By way of an active and controlled or regulated utilisation of the auxiliary drive 12, the direct-on-line-start of the main drive 11 can be supported, namely without the supply network 15 being subjected to an impermissibly high load.

Further details and versions of the invention are described in the following making reference to FIGS. 2 to 8.

Figure 2:
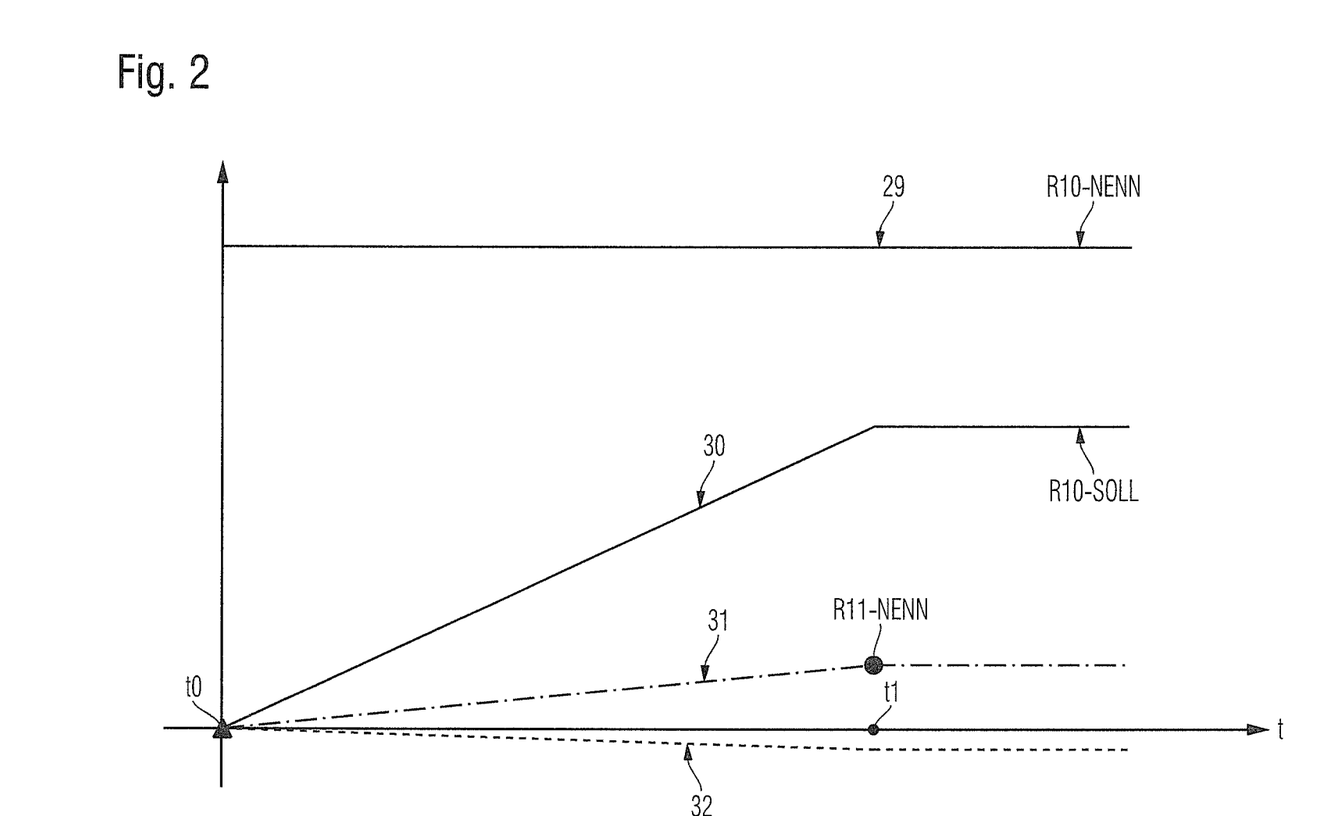
FIG. 2 is a time diagram for illustrating the invention.

FIG. 2 shows a configuration according to one aspect of the invention, in which for starting the drive train and for towing the drive train 10, the auxiliary drive 12 and the main drive 11 are started at the same time. FIG. 2 shows over the time t multiple signal curves, namely with the signal curve 29 a rated rotational speed n10-RATED for the drive train 10, with the signal curve 30 a rotational speed formed utilising the invention on the drive train 10, with the signal curve 31 a rotational speed of the main drive 11 and with the signal curve 32 a rotational speed of the auxiliary drive 12.

Starting at the time t0, the drive train is to be started in FIG. 2 and the drive train 10 tow-started to a set rotational speed n10-SET. Here, the main drive 11 and the auxiliary drive 12 in FIG. 2 according to the signal curves 31 and 32 are started at the same time, namely in such a manner that here according to the signal curve 30 the rotational speed of the drive train 10 is continuously increased, namely to the set rotational speed n10-SET, which the drive train 10 reaches at the time t1 according to the signal curve 30. The increase of the rotational speed of the drive train 10 need not be mandatorily linear. This set rotational speed n10-SET, to which the drive train 10 is to be tow-started, is smaller than the rated rotational speed 29 n10-RATED of the same, corresponds to a defined percentage of the rated rotational speed 29, for example 70% or 80% of the rated rotational speed 29.

For towing the drive train 10 to the set rotational speed n10-SET, the main drive 11, pending the reaching of the defined set rotational speed at the time t1, i.e. between the times t0 and t1, is operated motorically in forward mode according to the signal curve 31 and the auxiliary drive 12, parallel to this in time, is operated motorically in reverse mode. The main drive 11 is accelerated up to the time to its rated rotational speed n11-RATED.

The auxiliary drive 12 that can be operated with variable rotational speed is operated in a controlled or regulated manner by suitably activating the converter 14 in such a manner that the continuous but not mandatorily linear increase of the rotational speed of the drive train 10 shown in FIG. 2 by the signal curve 30 forms, namely up to the time t1 when the drive train 10 has been tow-started up to the defined set rotational speed n10-SET.

Thus, at the time t1, the main drive 11 then reaches its rated rotational speed n11-RATED, wherein at the time t1 through suitable activation of the converter 14, the auxiliary drive 12 is changed from the motorically reverse-rotating operation to a generatorically reverse-rotating operation. A time t1, i.e. on reaching the defined set rotational speed n10-SET on the drive train 10 and on reaching the rated rotational speed n11-RATED on the main drive 11, the actual starting operation of the drive train is completed.

It is pointed out here that the auxiliary drive 12, which can be operated with variable rotational speed, is preferentially designed as electric machine which can be operated in the four-quadrant mode, i.e. both motorically reverse-rotating, and also generatorically reverse-rotating as well as motorically forward-rotating and generatorically forward-rotating.

Further details of the first version of the invention, according to which for towing the drive train 10 the main drive 11 and the auxiliary drive 12 are started simultaneously, are described in the following making reference to the signal flow diagram of FIG. 3.

Figure 3:
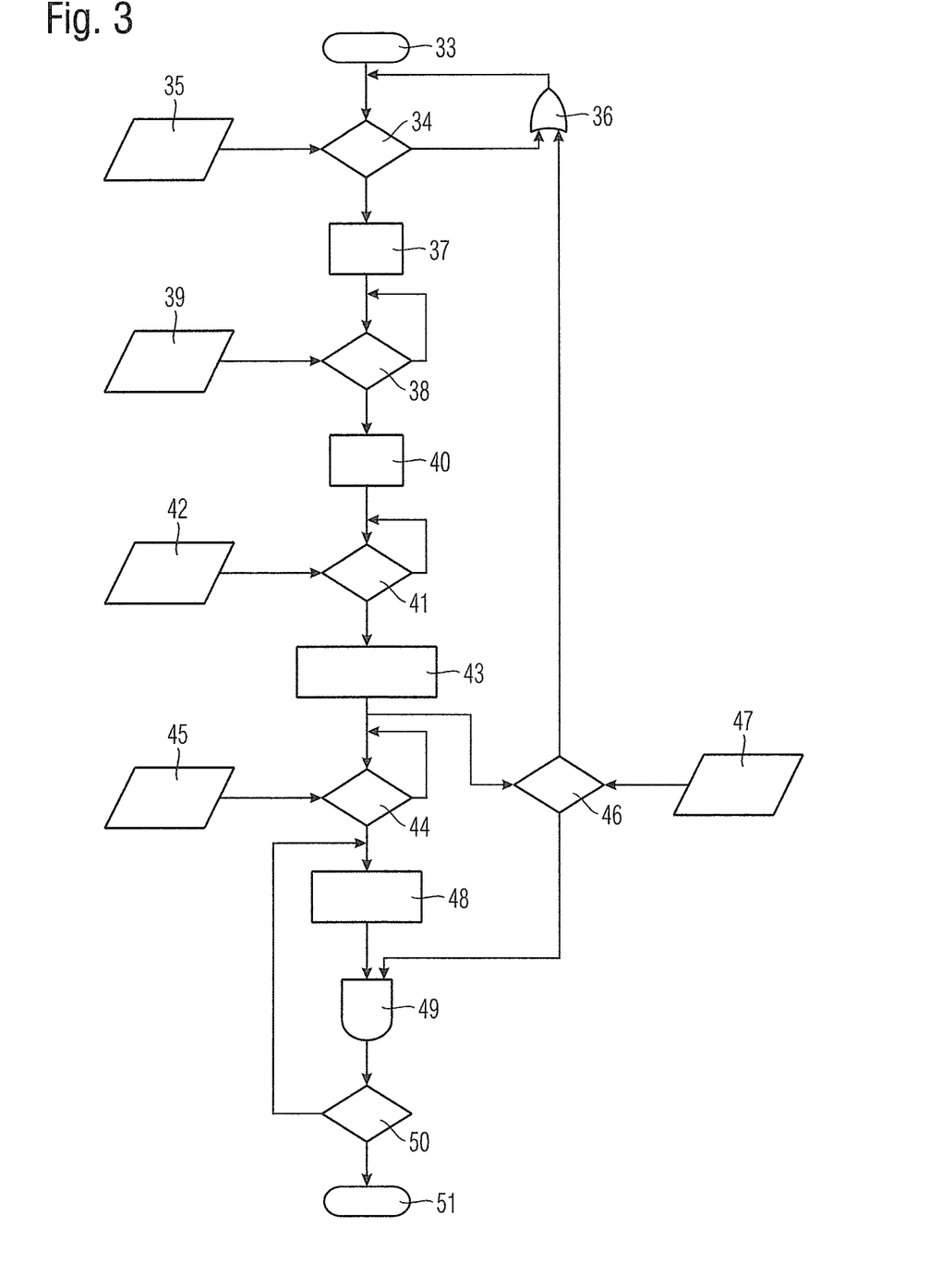
FIG. 3 is a signal flow diagram for illustrating further details of the invention.

In FIG. 3, a block 33 depicts the start of the method according to one aspect of the invention. In a block 34 it is checked if a start condition for the drive train is fulfilled. This can take place by querying characteristic variables provided in a block 35.

In block 35, information as to whether the drive train is in the stationary state, whether the main drive 11 is ready, whether the brake 19 that may be present is opened and such like can be provided as characteristic variables in block 35. If it is determined in block 34 that starting conditions for the drive train are not fulfilled, the diagram, emanating from block 34 via an OR-block 36 branches back to block 34 in the sense of a loop whereas in particular when it is determined in block 34 that starting conditions for the drive train are fulfilled, the diagram branches off from block 34 to block 37. In block 37, a start release is generated and transmitted to the control unit 24 and if applicable to the control unit 21. The OR-block 36 is a logical OR.

In a following block 38 it is checked whether a start command, which is provided in a block 39, is present or not present. If the start command is not present, the diagram emanating from block 38 branches back to block 38 in the sense of a loop. If by contrast the start command is present, the diagram, emanating from block 38, branches off to block 40, wherein in block 40 a start command for the converter 14 is then generated. There, the auxiliary drive 12 in block 40 is magnetised and initially held at a rotational speed of zero.

In a following block 41 it is checked if the converter 14 is ready, wherein a corresponding readiness signal from the converter 14 is provided in block 42. If it is determined in block 41 that the converter 14 is not yet ready, the diagram, emanating from block 41 branches back to block 41 in the sense of a loop, whereas in particular when it is determined in block 41 that the converter 14 is ready, the diagram emanating from block 41 branches off to block 43. In block 43, a release signal for the main drive 11 is then generated, wherein the main drive 11 is then switched on or started, namely by closing the circuit breaker 20, via a direct-on-line-start directly via the supply network 15. The converter 14 is also switched on in block 43.

In the following, it is checked in a block 44 if the main drive 11 rotates, wherein a corresponding rotational speed signal of the main drive 11 is provided in block 45. Furthermore, the diagram, emanating from block 43, branches off to block 46, wherein it is checked in block 46 if the drive train 10 rotates, wherein a corresponding rotational speed signal of the drive train 10 is provided in block 47.

If it is determined in block 44 that the main drive 11 does not rotate, the diagram, emanating from block 44, branches back to block 44 in the sense of a loop, whereas in particular when it is determined in block 44 that the main drive 11 rotates, the diagram, emanating from block 44, branches off to block 48. In block 48 the auxiliary drive 12 is operated in a controlled and/or regulated manner, namely motorically in reverse mode, so that a constant increase of the rotational speed up to the set rotational speed forms on the drive train 10. The auxiliary drive 12 in the process is to be accelerated motorically in reverse mode to its maximum permissible rotational speed.

As already explained, it is checked in block 46 if the drive train 10 rotates. If this is not the case, the diagram, emanating from block 46, branches off to the OR-block 36. If by contrast it is determined in block 46 that the drive train 10 rotates, the diagram, emanating from block 46, branches off to the AND-block 49. The AND-block 49 is a logical AND. Thus, when in block 49 it is determined on the one hand emanating from block 46 that the drive train 10 rotates and additionally emanating from block 48 it is ensured that the auxiliary drive 12 is accelerated, the diagram then branches off emanating from block 49 to block 50, wherein it is checked in block 50 if the auxiliary drive 12 has reached its maximum permissible rotational speed and thus the drive train 10 has reached its defined set rotational speed. If it is determined in block 50 that this is not the case, the diagram, emanating from block 50, branches off to block 48 and the rotational speed of the auxiliary drive 12 is further increased in a controlled or regulated manner via the converter. If by contrast it is determined in block 50 that the auxiliary drive 12 has reached its maximum permissible rotational speed and thus the drive train 10 has reached its defined set rotational speed, the diagram, emanating from block 50, branches off to block 51 and the method is completed in block 51.

For towing the drive train 10 to its defined set rotational speed, the main drive 11 and the auxiliary drive 12 are started simultaneously in the embodiment of FIGS. 2 and 3. By contrast with this, FIGS. 4 and 5 show a configuration of the invention in which for towing the drive train 10 the auxiliary drive 12 is started at a time after the main drive 11 in order to definitively or safely exclude a reverse-rotation of the drive train during the starting operation.

Figure 4:
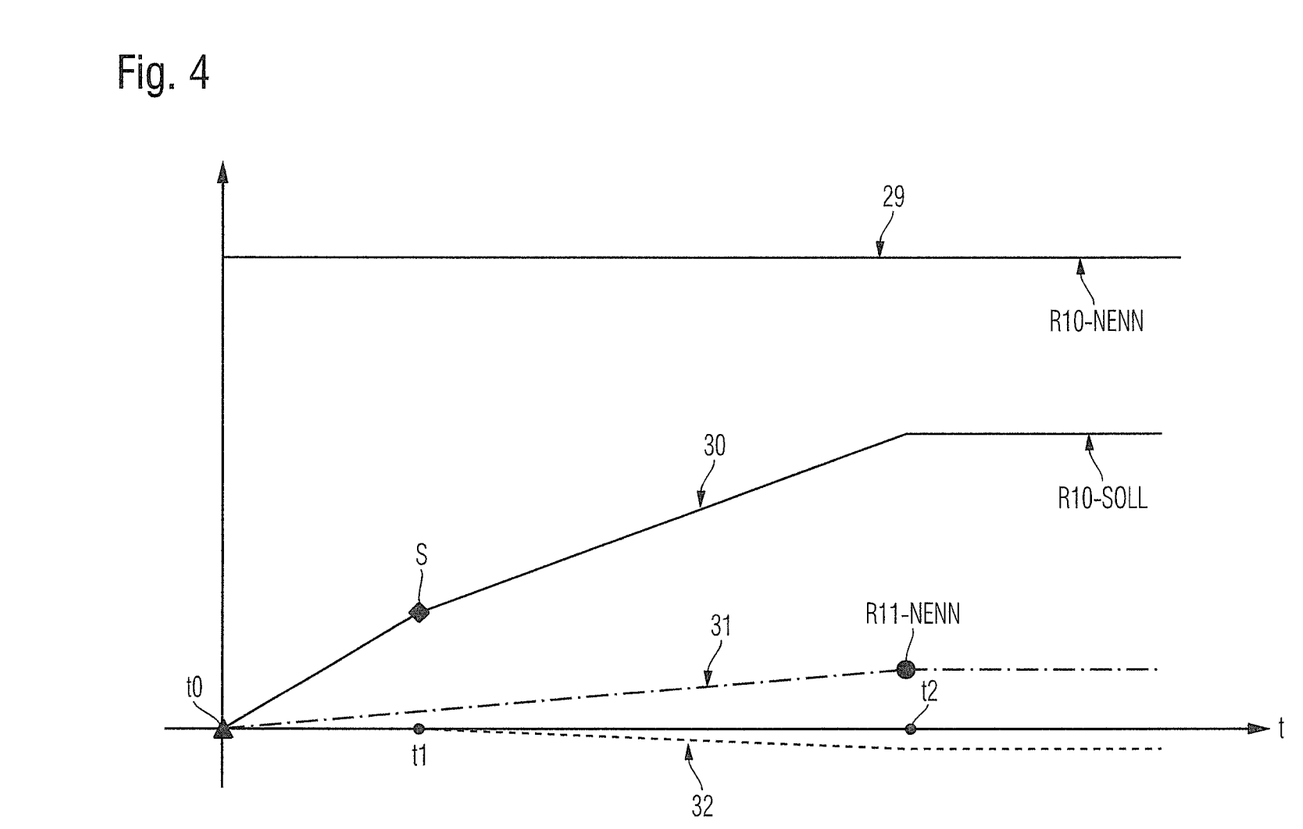
FIG. 4 is a time diagram for illustrating the invention
Figure 5:
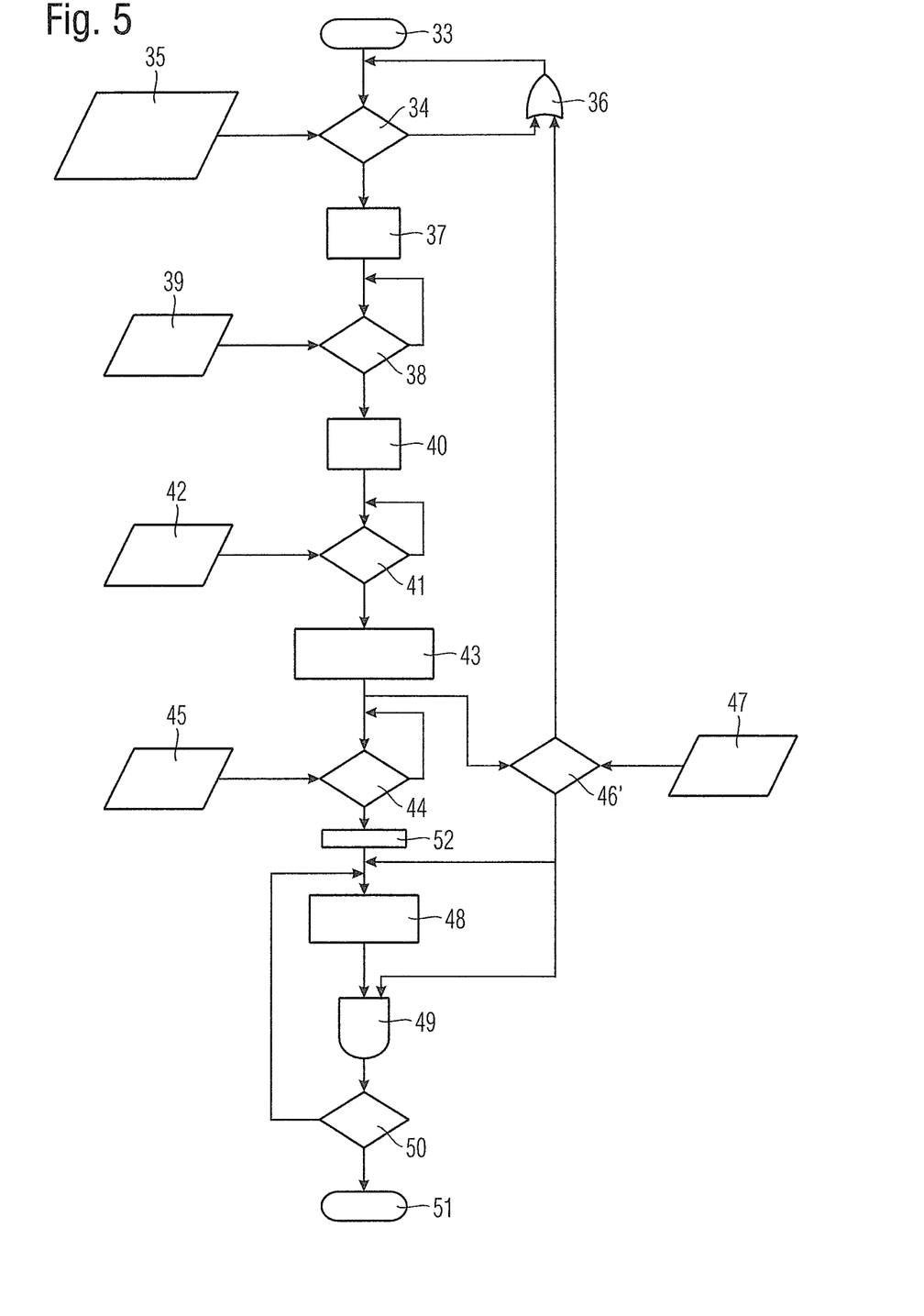
FIG. 5 is a signal flow diagram for illustrating further details of the invention.

In FIG. 4, the starting operation of the drive train or the towing of the drive train 10 is again started at the time t0, wherein initially, towing the drive train 10 (see curve profile 30) exclusively the main drive 11 (see curve profile 31) is operated motorically in forward mode, whereas the auxiliary drive 12 (see signal curve 32) is initially stationary. Starting with the time t1, the auxiliary drive 12 is subsequently also started according to the signal curve 32, namely either after the expiry of a defined time span after the starting of the main drive 11 at the time t0 or on reaching a defined threshold value S for the rotational speed of the drive train 10.

In FIG. 4, the rotational speed of the drive train 10 according to the curve profile 30 reaches a corresponding threshold value S at the time t1, so that then at the time t1 at a time after the starting of the main drive 11 the auxiliary drive 12 is also started. Starting with the time t1, the main drive 11, according to the curve profile 31, is still operated motorically in forward mode, furthermore, parallel to this in time, the auxiliary drive 12 according to the curve profile 32 is operated motorically in reverse mode, namely for as long as, up to the time t2 the drive train 10 has been tow-started to its defined set rotational speed n10-SET or the main drive 11 has reached its rated rotational speed n11-RATED.

In FIG. 4, the main drive 11 accordingly is initially started between the times t0 and t1 and operated motorically in forward mode, in order to initially tow-start the drive train 10. Between the times t0 and t1, the main drive 11 is operated motorically in forward mode, the auxiliary drive 12 is stationary, wherein the stationary state of the auxiliary drive 12 can be provided by way of activating the converter 14 or alternatively also by way of a break. At the time t1, the auxiliary drive 12 is then also started in a time-controlled or rotational speed-controlled manner and operated parallel in time with the further motoric forward operation of the main drive 11 operated motorically in reverse mode. This again takes place in such a manner that between the times t1 and t2 a continuous increase of the rotational speed of the drive train 10 materialises until at the time t2 the drive train 10 has reached its defined set rotational speed n10-SET or the main drive 11 has reached its rated rotational speed n11-RATED. Because of the fact that at the time t1 the auxiliary drive 12 is started and operated motorically in reverse mode, the gradient of the rotational speed curve 30 for the drive train 10 at the time t1 becomes flatter.

As soon as at the time t2 the main drive has reached its rated rotational speed n11-RATED or the drive train 10 has been tow-started to its defined set rotational speed n10-SET, the actual starting operation for the drive train is again completed, the auxiliary drive 12 changes, by suitable activation of the converter 14, to a generatoric reverse operation.

A block diagram for the method version of FIG. 4 is shown by FIG. 5, wherein in FIG. 5 for blocks or steps corresponding to the blocks of FIG. 3, same reference numbers are used. In the following, reference regarding these blocks is made to the explanations regarding FIG. 3, wherein for the signal flow diagram of FIG. 5 only such details are discussed in the following by which the signal flow diagram of FIG. 5 differs from the signal flow diagram of FIG. 3.

While in the signal flow diagram of FIG. 3 it is checked in block 46 if the drive train 10 rotates, it is checked in block 46' of FIG. 5 if the rotational speed of the drive train 10 is greater than a threshold value. If this is the case, the diagram, emanating from block 46' branches off to block 48 and on the other hand to the AND-block 49. Accordingly, the auxiliary drive 12 is only started and subsequently driven motorically in reverse mode when the rotational speed of the drive train 10 is greater than the threshold value or has reached the threshold value.

Furthermore, FIG. 5 shows a version with a block 52 in which a time delay between the starting of the main drive 11 and the starting of the auxiliary drive 12 is provided. In particular when the block 52 is present, the diagram, emanating from block 46' branches off to the AND-block 49 but not to the block 48. If the block 52 is not present, the diagram, emanating from block 46' branches off to the block 48 and to the AND-block 49.

Figure 6:
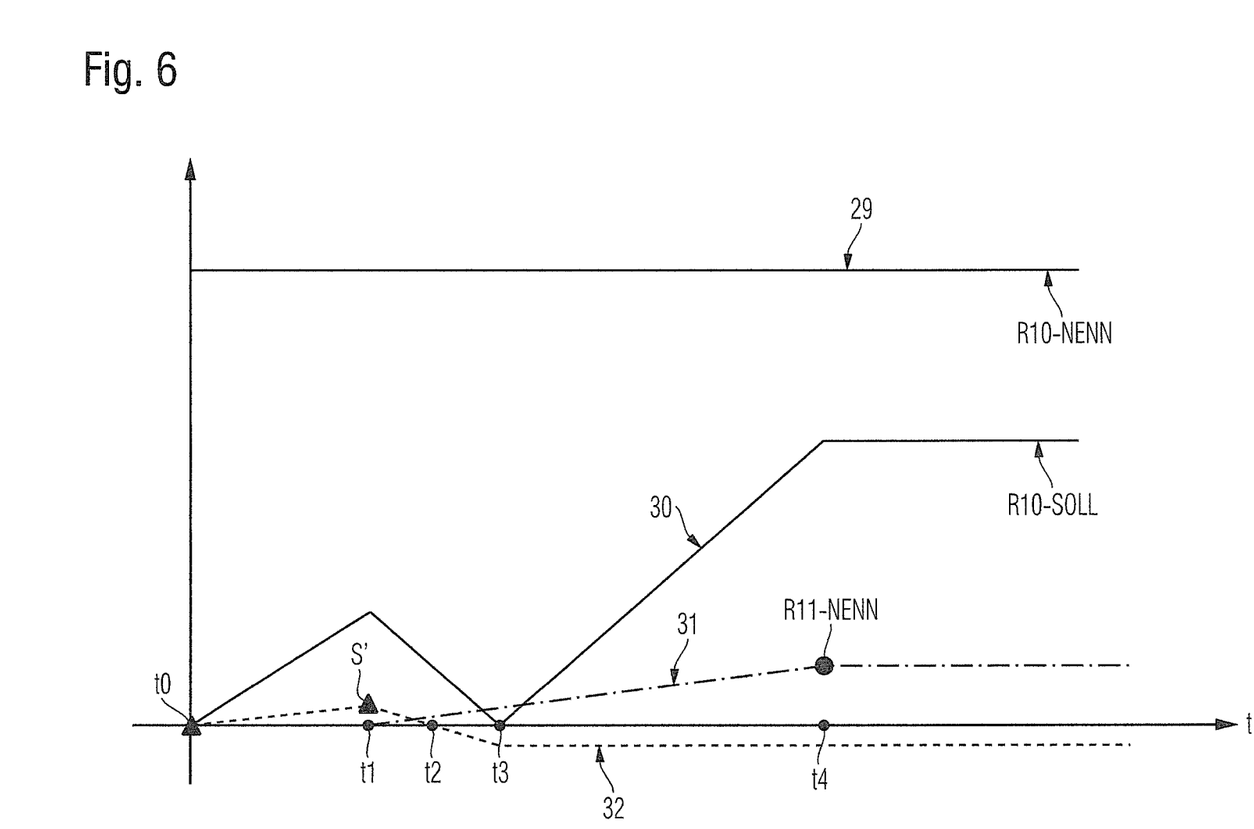
FIG. 6 is a time diagram for illustrating the invention.

A further embodiment of the invention is shown by FIG. 6, wherein in FIG. 6 the curve profiles 29, 30, 31, and 32 are shown above the time t. The embodiment of FIG. 6 differs from the embodiments described above in that for starting the drive train and accordingly for towing the drive train 10 the auxiliary drive 12 is temporally started before the main drive 11, namely in such a manner that initially, towing the drive train 10, exclusively the auxiliary drive 12 is operated motorically in forward mode and the main drive 11 is initially stationary, wherein in the following on reaching a defined threshold value S' for the rotational speed of the auxiliary drive 12 the main drive 11 is operated motorically in forward mode and parallel to this the auxiliary drive 11 is initially operated motorically in forward mode and subsequently motorically in reverse mode.

Accordingly, FIG. 6 shows that at the time t0 the drive train is started and the drive train 10 is to be tow-started, from the stationary state, to a set rotational speed n10-SET, which in turn corresponds to a percentage of the rated rotational speed 29 of the drive train 10.

Initially, namely up to the time t1, exclusively the auxiliary drive 12 (see curve profile 32) is driven motorically in forward mode, wherein by way of this the drive train 10 according to the curve profile 30 is tow-started. The main drive 11 is stopped, wherein the stopping of the main drive 11 can take place either by way of its mass inertia alone or alternatively by way of a break or other device. In particular when at the time t1 the rotational speed of the auxiliary drive 12 reaches the defined threshold value S', in particular its maximum rotational speed, the main drive 11, starting at the time t1 according to the curve profile 31, is started via a DOL-start and subsequently operated motorically in forward mode. Based on the torque and the mass inertias of the drive train 10, the rotational speed of the auxiliary drive 12, parallel to the motoric forward operation of the main drive 11, is then lowered synchronously with the rotational speed at the output, wherein at the time t2 a change from the motoric forward operation into a motoric reverse operation takes place on the auxiliary drive 12.

At the time t3, the auxiliary drive 12 rotates in reverse with its maximum rotational speed, wherein according to the curve profile 30 a rotational speed of zero is then present on the drive train 10. Starting with the time t3, the drive train 10 according to the signal curve 30 is now tow-started further and accelerated via the main drive (see signal curve 31) operated motorically in forward mode and, namely up to the time t4, as soon as the drive train 10 has again reached its set rotational speed.

As soon as at the time t4 the drive train 10 has reached its set rotational speed or the main drive 11 has reached its rated rotational speed, the starting operation is concluded and for the auxiliary drive 12, a change from the motoric reverse operation into a generatoric reverse operation, namely by activation of the converter 14, takes place again.

Figure 7:
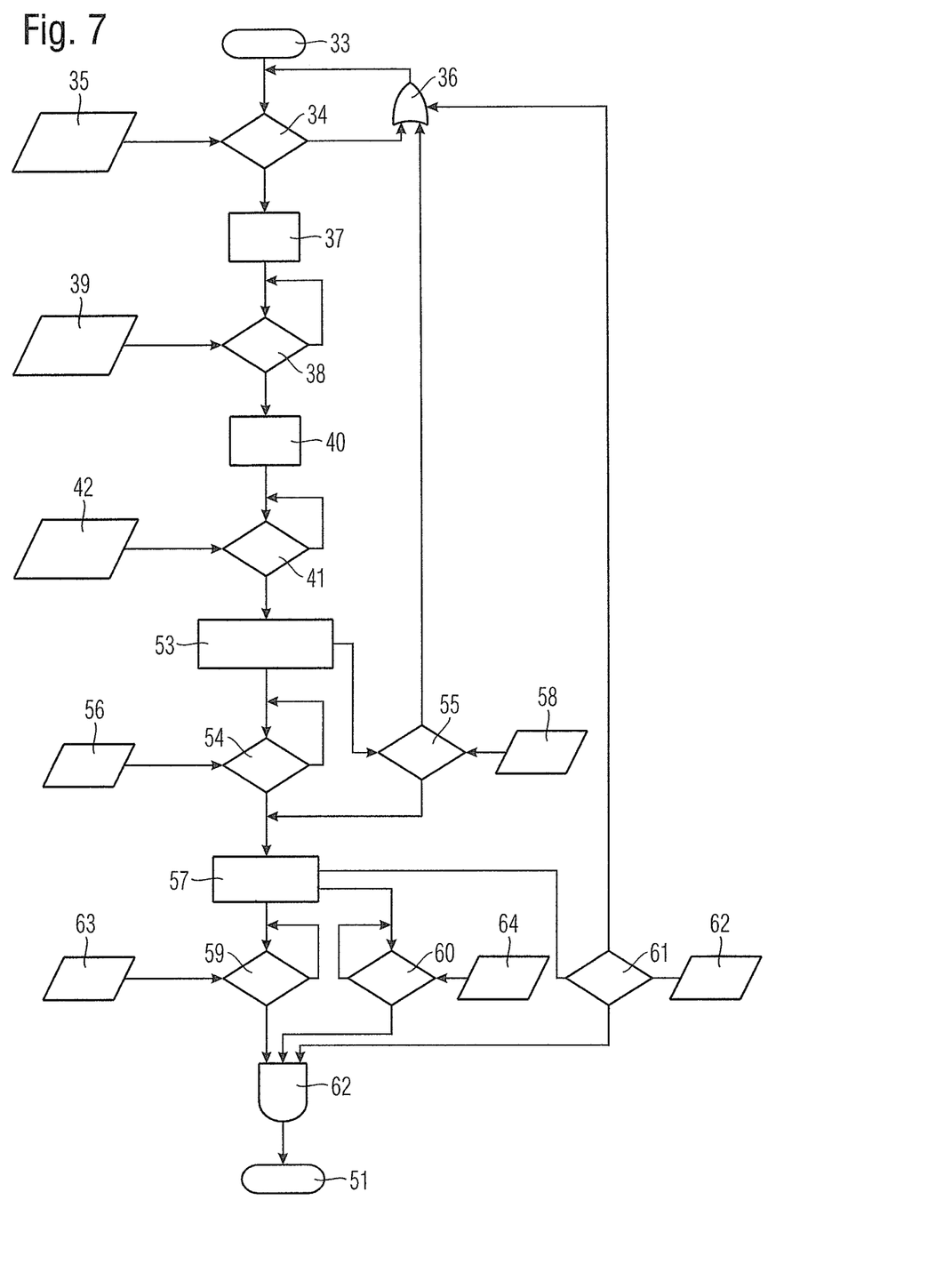
FIG. 7 is a signal flow diagram for illustrating further details of the invention.

A signal flow diagram for the method version of FIG. 6 is shown in FIG. 7.

The block 33 of FIG. 7 is a start of the method according to the invention, wherein after the start of the method according to the invention it is again checked in a block 34 if start conditions for the drive train are fulfilled, which are provided in block 35. If such starting condition are fulfilled, the diagram, emanating from block 34 again branches off to block 37 and is transmitted as a start release to the or each of the control units 21, 24. Following this, it is again checked in a block 38 if a start command, which is provided in block 39, is present, wherein in particular when it is determined in block 38 that such a start command is present, the diagram, emanating from block 38, again branches off to block 40, wherein in block 40 a start command is transmitted to the converter 14 and the auxiliary drive 12 switched on and magnetised, however is initially held at a rotational speed of zero. In particular when in block 41 it is determined that in block 42 the converter 14 sends a readiness signal, that it is thus determined in block 41 that the converter 14 is ready, the diagram, emanating from block 41 branches off to block 53, wherein in block 53 the main drive 11 is held at a rotational speed of zero, for example via an activation of a brake.

Emanating from the block 53, the diagram on the one hand branches off to block 54 and on the other hand to block 55. In block 54 it is checked if with locked main drive 11 the rotational speed of the auxiliary drive 12 has reached the defined threshold value or its maximum rotational speed, wherein in block 56 a rotational speed signal regarding the auxiliary drive 12 is provided, in particular from the converter 14. If it is determined in block 54 that the rotational speed of the auxiliary drive 12 has not yet reached its threshold value or its maximum rotational speed, the diagram, emanating from block 54, branches back to block 54 in the sense of a loop, whereas in particular when in block 54 it is determined that the rotational speed of the auxiliary drive 12 has reached the defined threshold value or the maximum rotational speed, the diagram, emanating from block 54, branches off to block 57.

As already explained, the diagram, emanating from block 53 branches off not only to block 54 but also to block 55, wherein in block 55 it is checked if the rotational speed of the drive train is greater than zero, i.e. if the drive train 10 rotates, wherein a corresponding rotational speed of the drive train 10 is provided in block 58.

If it is determined in block 55 that the drive train 10 does not rotate, the diagram, emanating from block 55, branches off to block 36, whereas in particular when it is determined in block 55 that the rotational speed of the drive train 10 is greater than zero, the diagram also branches off to block 57.

In block 57, the main drive 11 is then started, namely by suitable activation of the circuit breaker 20 via a direct-on-line-start, wherein a break that might have been previously activated is released. Emanating from block 57, the diagram then branches off to the blocks 59, 60 and 61.

In block 59 it is checked if the auxiliary drive 11 now in the opposite direction of rotation, i.e. in the reverse operation, has reached its maximum rotational speed. If this is the case, the diagram, emanating from block 59, branches off to the AND-block 62. If by contrast this is not the case, the diagram branches back to block 59 in the sense of a loop.

In block 60 it is checked if the main drive 11 has reached its rated rotational speed. In particular when it is determined that this is the case, the diagram, emanating from block 60, again branches off to the AND-block 62, whereas in particular when it is determined in block 60 that the main drive 11 has not yet reached its rated rotational speed, the diagram branches back to block 60 in the sense of a loop, wherein for the blocks 59 and 60 corresponding rotational speed signals are provided in blocks 63 and 64, namely in block 63 the rotational speed of the auxiliary drive 12 and in block 64 the rotational speed of the main drive 11.

In block 61 it is checked if the drive train 10 rotates, wherein in particular when this is not the case, the diagram branches off to the OR-block 36, whereas in particular when in block 61 it is determined that the drive train 10 rotates, the diagram branches off to the AND-block 62. The rotational speed of the working machine 10 is provided for the block 61 in block 62.

In particular when all conditions checked in blocks 59, 60 and 61 are fulfilled, the diagram branches off to the block 51 via the AND-block 62 and the method is completed.

Figure 8:
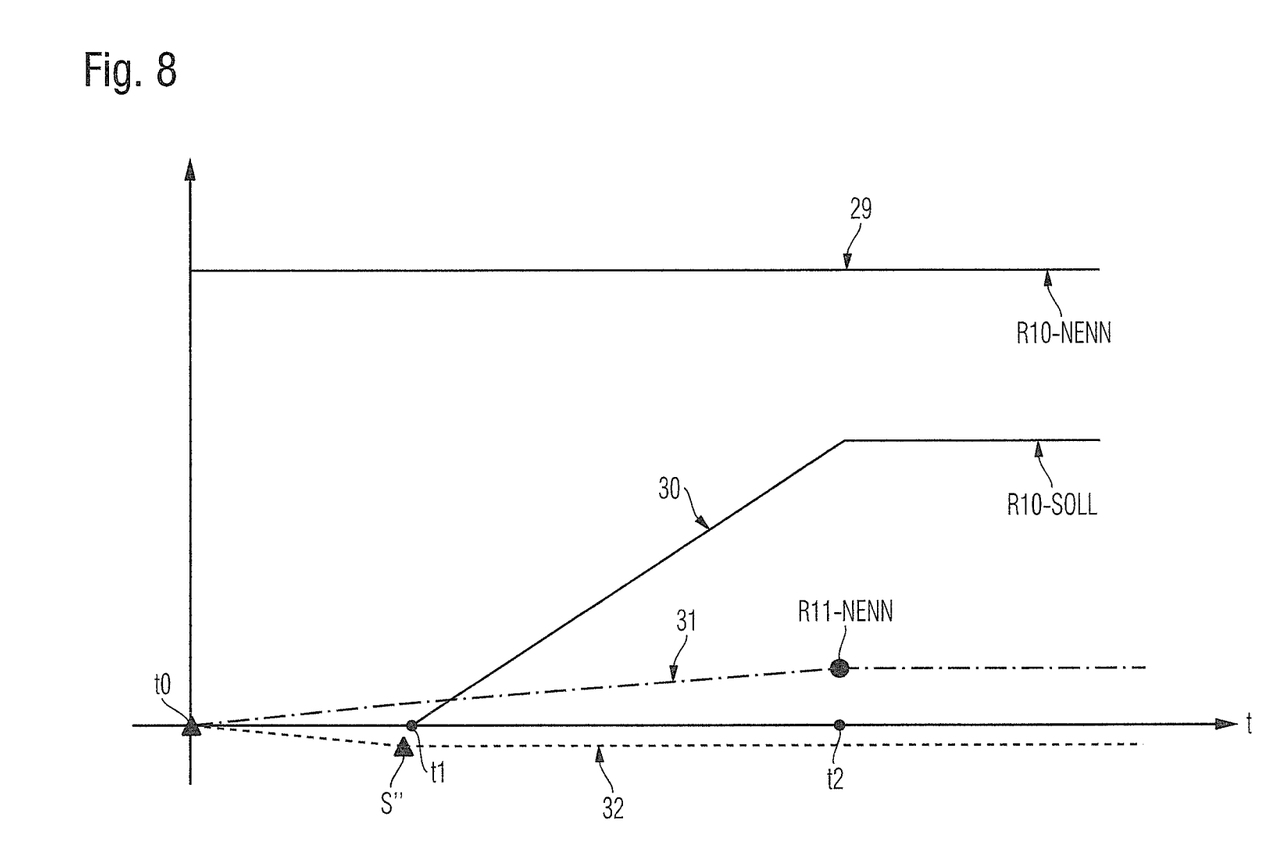
FIG. 8 is a time diagram for the invention.

A further version of the invention is described making reference to FIG. 8. FIG. 8 relates to a version of the invention, in which the auxiliary drive 12 is started at a time before the main drive 11, namely this time in such a manner that initially with stationary drive train 10 exclusively the auxiliary drive 12 is operated motorically in reverse mode and the main drive 11 is initially accelerated exclusively via the auxiliary drive 12. Only on reaching a defined threshold value S" for the rotational speed of the addition drive 12 is the main drive 11 also started and operated motorically in forward mode, wherein the auxiliary drive 12 is operated parallel to this.

Further details are described making reference to FIG. 8. Thus, in FIG. 8, the auxiliary drive 12, at the time t0, again with the starting of the drive train, commencing at the time t0 according to the signal curve 32, is initially started and operated motorically in reverse mode. According to the signal curve 30, the drive train 10 is initially stationary, wherein this can take place either via the mass inertia of the same or via a break or another device. The main drive 11 is accelerated via the auxiliary drive 12 according to the signal curve 31.

In particular when at the time t1 the rotational speed of the auxiliary drive 12 has reached a threshold value S" in particular its maximum rotational speed, a defined rotational speed likewise materialises on the main drive 11. This is obtained from the transmission ratio of the speed modulation gearbox and the maximum rotational speed of the auxiliary drive 12.

Commencing at the time t1, the main drive 11 is then also started, namely by a direct-on-line-start, wherein at the time t1 the locked drive train 10 is released if required. Commencing with the time t1, the rotational speed of the drive train 10 according to the curve profile 30 is thus increased continuously, and namely up to the time t2 when the main drive 11 has reached its rated rotational speed n11-RATED. At this time, the drive train 10 has then been accelerated to its defined set rotational speed, which corresponds to a defined percentage of the rated rotational speed 29 of the drive train 10, so that at the time t2 the actual starting operation is concluded.

With the time t2, the motoric reverse operation for the auxiliary drive 12 is again changed into a generatoric reverse operation, namely by activating the converter 14.

The invention, furthermore, relates to a control unit for operating a drive train with a drive train 10 designed in particular as pump or compressor, having a main drive 11 designed as an electric machine that can be operated with a constant rotational speed, having an auxiliary drive 12 that is designed as an electric machine that can be operated with a variable rotational speed, and having a speed modulation gearbox 13 with a fixed mechanical transmission ratio connected between the two drives 11, 12 and the drive train 10.

The control unit, for starting the drive train and for towing the drive train 10 to a defined set rotational speed, carries out the following step on the control side:

Starting the main drive 11 via a direct-on-line-start with direct coupling to a supply network 15.

Starting the auxiliary drive 12 subject to intermediate connection of a converter 14 with indirect coupling to the supply network 15 simultaneously with the main drive 11 or at a time before the main drive 11 or at a time after the main drive 11.

Operating the main drive 11 and auxiliary drive 12 for towing the drive train 10 to the defined set rotational speed, which corresponds to a defined percentage of a rated rotational speed of the drive train 10, wherein the control unit operates the main drive 11 motorically in forward mode at least at times and accelerating it to its rated rotational speed, wherein the control unit, parallel to this, operates the auxiliary drive 12 at least at times motorically in reverse mode.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a drive train for starting the drive train and for towing the drive train to a defined set rotational speed, which corresponds to a defined percentage of a rated rotational speed of the drive train, the drive train configured as a pump or a compressor, having a main drive that is an electric machine that can be operated with a constant rotational speed, having an auxiliary drive that is an electric machine that can be operated with a variable rotational speed, and having a speed modulation gearbox with a fixed mechanical transmission ratio connected between the main drive and the auxiliary drive and the drive train, comprising:

starting the main drive via a direct-on-line-start with direct coupling to a power supply network;

starting the auxiliary drive, subject to an intermediate connection of a converter with indirect coupling to the power supply network at a time before the main drive, such that from a time t0 until a time t1, the auxiliary drive is rotating in a second auxiliary drive rotating direction and operated as a motor, is towing the drive train and the main drive is initially stationary until a time t1; and operating the main drive as a motor in a first main drive rotating direction at least at times and accelerated to its rated rotational speed for towing the drive train to the defined set rotational speed and parallel to this the auxiliary drive is operated motorically in the second auxiliary drive rotating direction at least at times.

2. The method according to claim 1, further comprising: operating the auxiliary drive subsequently generatorically in the second auxiliary drive rotating direction, at least at times, on reaching the defined set rotational speed on the drive train and/or on reaching the rated rotational speed on the main drive.

3. The method according to claim 1, wherein on reaching the defined set rotational speed on the drive train or on reaching the rated rotational speed on the main drive, the starting of the drive train is completed.

4. The method according to claim 1, wherein on reaching the defined set rotational speed on the drive train and/or on reaching the rated rotational speed on the main drive the converter is activated to change an operation of the auxiliary drive from motorically in the second auxiliary drive rotating direction to operate generatorically in the second auxiliary drive rotating direction.

5. The method according to claim 1,
wherein upon reaching a defined threshold value for the rotational speed of the auxiliary drive, the main drive is operated motorically in and parallel to this the auxiliary drive is operated initially motorically in the first auxiliary drive rotating direction from time t1 to time t2 and following starting at time t2 this motorically in the second auxiliary drive rotating direction.

6. The method according to claim 5, wherein the main drive is held at zero rotational speed via its mass inertia or a brake for its stationary state.

7. The method according to claim 5, wherein the defined threshold value for the rotational speed of the auxiliary drive is a maximum rotational speed of the auxiliary drive.

8. The method according to claim 1, wherein the defined threshold value for the rotational speed of the auxiliary drive is a maximum rotational speed of the auxiliary drive.

9. A control unit configured to operate a drive train, having a main drive designed as electric machine operable with a constant rotational speed, an auxiliary drive designed as electric machine operable with a variable rotational speed, and a speed modulation gearbox with a fixed mechanical transmission ratio connected between the two drives and the drive train, wherein the control unit for starting the drive train and for towing the drive train to a defined set rotational speed carries out the following on a control side:

starting the auxiliary drive subject to an intermediate connection of a converter with indirect coupling to the supply network at a time before the main drive, such that from a time t0 until a time t1, the auxiliary drive is rotating in a second auxiliary drive rotating direction; starting the main drive via a direct-on-line-start with direct coupling to a supply network in a first main drive rotating direction; and operating the main drive and auxiliary drive for towing the drive train to the defined set rotational speed which corresponds to a defined percentage of a rated rotational speed of the drive train, wherein the control unit operates the main drive motorically in the first main drive rotating direction at least at times, accelerating it to its rated rotational speed, wherein the control unit, parallel to this, operates the auxiliary drive motorically in the second auxiliary drive rotating direction at least at times.

\* \* \* \* \*

UNITED STATES PATENT AND TRADEMARK OFFICE
CERTIFICATE OF CORRECTION

PATENT NO. : 11,493,126 B2
APPLICATION NO. : 16/779945
DATED : November 8, 2022
INVENTOR(S) : Michael Paula et al.

It is certified that error appears in the above-identified patent and that said Letters Patent is hereby corrected as shown below:

In the Claims

Column 12, Lines 5-10 should read:
2. The method according to Claim 1, further comprising:
    operating the auxiliary drive subsequently generatorically in the first auxiliary drive rotating direction, at least at times, on reaching the defined set rotational speed on the drive train and/or on reaching the rated rotational speed on the main drive.

Column 12, Lines 15-21 should read:
4. The method according to Claim 1, wherein on reaching the defined set rotational speed on the drive train and/or on reaching the rated rotational speed on the main drive the converter is activated to change an operation of the auxiliary drive from motorically in the first auxiliary drive rotating direction to operate generatorically in the first auxiliary drive rotating direction.

Column 12, Lines 22-29 should read:
5. The method according to Claim l
    wherein upon reaching a defined threshold value for the rotational speed of the auxiliary drive, the main drive is operated motorically in and parallel to this the auxiliary drive is operated initially motorically in the second auxiliary drive rotating direction from time t1 to time t2 and following starting at time t2 this motorically in the first auxiliary drive rotating direction.

Signed and Sealed this
Twenty-sixth Day of March, 2024

Katherine Kelly Vidal
*Director of the United States Patent and Trademark Office*